(12) United States Patent
Egawa (10) Patent No.: US 7,926,268 B2
(45) Date of Patent: Apr. 19, 2011

(54) MASTER CYLINDER

(75) Inventor: Takashi Egawa, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 450 days.

(21) Appl. No.: 12/149,654

(22) Filed: May 6, 2008

(65) Prior Publication Data

US 2008/0276612 A1  Nov. 13, 2008

(30) Foreign Application Priority Data

May 11, 2007 (JP) ................................. 2007-126710

(51) Int. Cl.
*F15B 7/08* (2006.01)

(52) U.S. Cl. ....................................................... 60/585

(58) Field of Classification Search ................... 60/584, 60/585, 586
See application file for complete search history.

(56) References Cited

U.S. PATENT DOCUMENTS

| | | | |
|---|---|---|---|
| 4,445,334 A * | 5/1984 | Derrick ........................ | 60/585 |
| 4,640,098 A * | 2/1987 | Brademeyer et al. ........... | 60/585 |
| 4,773,224 A * | 9/1988 | Sakamoto et al. .............. | 60/585 |
| 6,290,306 B1 * | 9/2001 | Friedow ......................... | 60/585 |
| 7,073,333 B2 * | 7/2006 | Tsubouchi et al. ............. | 60/585 |
| 7,181,911 B2 * | 2/2007 | Ishikawa et al. ............... | 60/585 |

FOREIGN PATENT DOCUMENTS

JP  63-297162 A  12/1988

* cited by examiner

*Primary Examiner* — Michael Leslie
(74) *Attorney, Agent, or Firm* — Buchanan Ingersoll & Rooney PC (57) ABSTRACT

A master cylinder includes a cylinder body, a reservoir connection port formed at a surface of the cylinder body and being in communication with a reservoir, a pressure chamber formed inside of the cylinder body, a reservoir fluid passage connecting the reservoir connection port and the pressure chamber, a valve mechanism accommodated within the reservoir connection port and reducing an amount of fluid flowing in the reservoir fluid passage in a case where the reservoir fluid passage is at a high pressure, and a valve body including a small diameter cylindrical portion and a large diameter cylindrical portion, the small diameter cylindrical portion forming a passage by means of which the reservoir and the reservoir fluid passage communicate, the large diameter cylindrical portion having one end connected to the small diameter cylindrical portion and the other end fixed to the reservoir connection port, the valve body accommodating the valve mechanism.

7 Claims, 5 Drawing Sheets

MASTER CYLINDER

CROSS REFERENCE TO RELATED APPLICATIONS

This application is based on and claims priority under 35 U.S.C. §119 to Japanese Patent Application No. 2007-126710, filed on May 11, 2007, the entire content of which is incorporated herein by reference.

FIELD OF THE INVENTION

This invention generally relates to a master cylinder used for a hydraulic brake apparatus for a vehicle.

BACKGROUND

A known master cylinder includes a cylinder body, a reservoir, and a reservoir fluid passage that is equipped with a valve mechanism and that is arranged between a pressure chamber provided at the cylinder body and the reservoir. The reservoir fluid passage has a high suction performance, i.e., performance for supplying a brake fluid from the reservoir through the pressure chamber in response to a request for a supply of the brake fluid from a hydraulic control system that is electronically controlled. The valve mechanism is provided for preventing the brake fluid from suddenly counterflowing from the pressure chamber disposed at the cylinder body to a fluid chamber disposed at the reservoir. Such master cylinder is disclosed in JP2693154B. According to a structure of a master cylinder in which a leg portion provided at a reservoir tank (hereinafter simply referred to as a "reservoir") is positioned within a reservoir connection port formed at a cylinder body, and a valve mechanism (valve apparatus) is arranged at a lower side of the leg portion, a bottom surface of the reservoir is positioned relatively high and thus a performance for accommodating the master cylinder within an engine room deteriorates. Thus, the master cylinder disclosed in JP2693154B includes a receiving portion formed inside (precisely, at a bottom portion) of the reservoir so as to receive a valve body of the valve mechanism at a position higher than the bottom surface. Accordingly, the bottom surface of the reservoir is prevented from being positioned relatively high. Further, the master cylinder includes a supply passage for the brake fluid formed at a sidewall of the receiving portion to thereby consume the brake fluid up to the bottom surface within the reservoir.

According to the master cylinder disclosed in JP2693154B, a relief pressure generated by the valve mechanism is received by the reservoir. Therefore, the relief pressure causes the reservoir to be upwardly pushed, which may lead to a lifting of the reservoir, a disengagement of the reservoir from the cylinder body, a breakage of the reservoir, and the like. In addition, a slit and a lateral bore are formed at the reservoir for supplying the brake fluid from the reservoir by bypassing the valve mechanism and for returning the brake fluid to the reservoir after the brake fluid passes through the valve mechanism, respectively, while the receiving portion (precisely, a wall thereof) is formed to be higher than the bottom surface of the reservoir. As a result, a molding performance of the reservoir may be difficult.

A further downsizing of the master cylinder is necessary while a mounting space thereof is limited within the engine room. On the other hand, the elimination of concerns about the disengagement of the reservoir from the cylinder body and the breakage of the reservoir, the improvement of the molding performance of the reservoir, and the like are also required.

A need thus exists for a master cylinder which is not susceptible to the drawback mentioned above.

SUMMARY OF THE INVENTION

According to an aspect of the present invention, a master cylinder includes a cylinder body arranged in communication with a reservoir, a reservoir connection port formed at a surface of the cylinder body and being in communication with the reservoir, a pressure chamber formed inside of the cylinder body, a reservoir fluid passage connecting the reservoir connection port and the pressure chamber to each other, a valve mechanism accommodated within the reservoir connection port and reducing an amount of fluid flowing in the reservoir fluid passage in a case where the reservoir fluid passage is at a high pressure, and a valve body including a small diameter cylindrical portion and a large diameter cylindrical portion, the small diameter cylindrical portion forming a passage by means of which the reservoir and the reservoir fluid passage communicate with each other, the large diameter cylindrical portion having one end connected to an end portion of the small diameter cylindrical portion and the other end fixed to the reservoir connection port, the valve body accommodating the valve mechanism.

According to another aspect of the present invention, a master cylinder includes a cylinder body arranged in communication with a reservoir, a reservoir connection port formed at a surface of the cylinder body and being in communication with the reservoir, a pressure chamber formed inside of the cylinder body, a reservoir fluid passage connecting the reservoir connection port and the pressure chamber to each other, a valve mechanism accommodated within the reservoir connection port and reducing an amount of fluid flowing in the reservoir fluid passage in a case where the reservoir fluid passage is at a high pressure, and a valve body including a small diameter cylindrical portion forming a passage by means of which the reservoir and the reservoir fluid passage communicate with each other and a communication bore formed adjacent to the small diameter cylindrical portion and opening towards the reservoir, the communication bore being arranged on an identical horizontal plane where a bottom wall of the reservoir is arranged.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
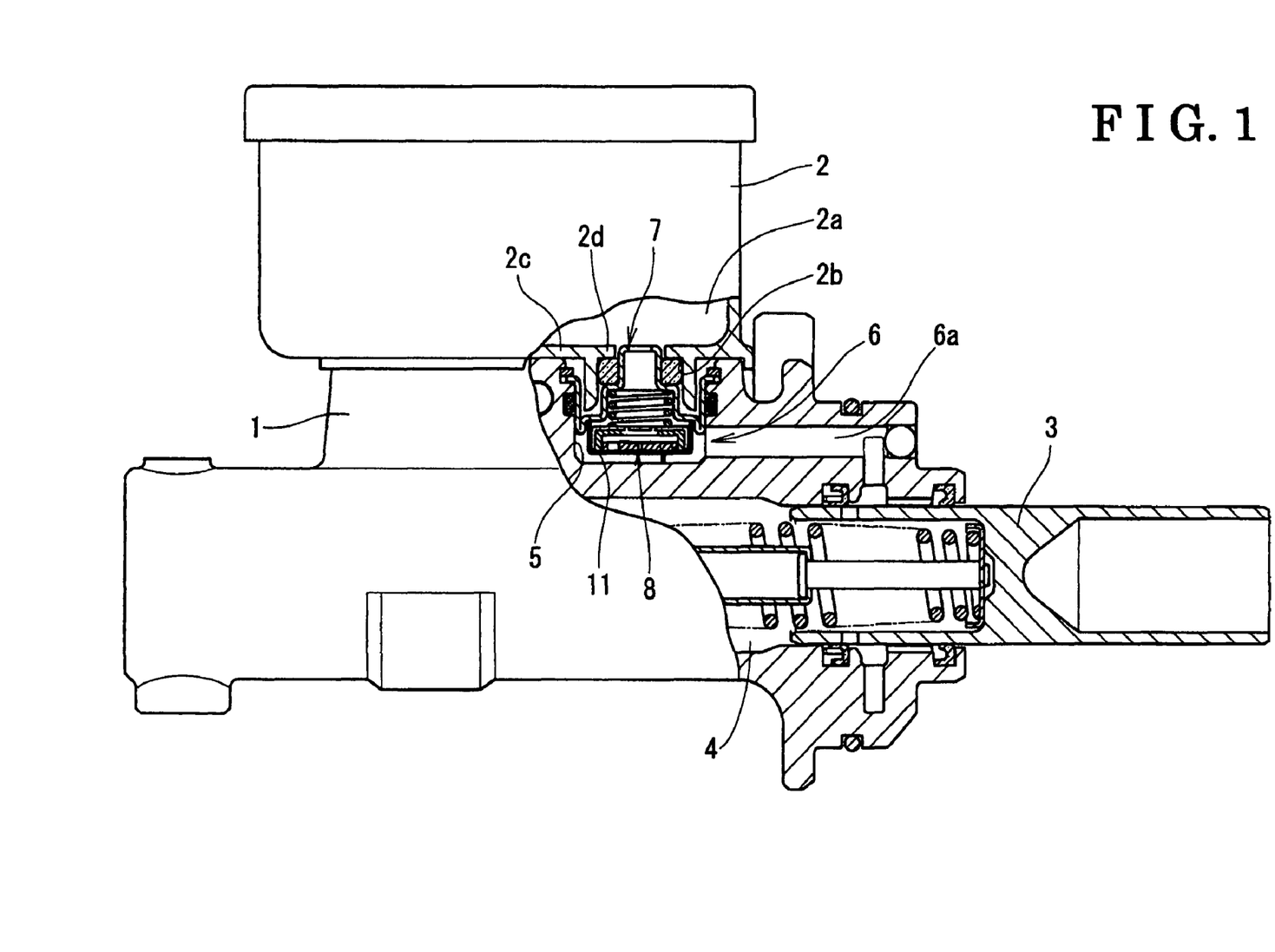
FIG. 1 is a partially broken side view schematically illustrating an overall structure of a master cylinder according to an embodiment of the present invention.

Embodiments of the present invention will be explained with reference to FIGS. 1 to 7. FIG. 1 illustrates an overall structure of a master cylinder according to a present embodiment. As illustrated in FIG. 1, a cylinder body 1 and a reservoir 2 including a fluid chamber 2a are arranged in communication with each other. The cylinder body 1 accommodates a primary piston 3, a secondary piston (not shown), return springs (not shown) for the primary and secondary pistons, cups (not shown) for sealing outer peripheries of the pistons, and the like. Then, pressure chambers 4, precisely, first and second pressure chambers, are defined between the primary piston 3 and the secondary piston, and between a front end portion (i.e., leftward side in FIG. 1) of the secondary piston and an end wall of the cylinder, respectively. The second pressure chamber is arranged on a front side (i.e., leftward side in FIG. 1) of the first pressure chamber. In FIG. 1, only the first pressure chamber 4 is illustrated.

The master cylinder according to the present embodiment has a known structure where a hydraulic pressure is generated at each of the pressure chambers 4 through a pressurization of a brake fluid by each of the primary and secondary pistons, and the hydraulic pressure generated is output and applied to a hydraulic control portion such as a disc brake for braking wheels (not shown). An internal structure or a hydraulic pressure generation mechanism of the master cylinder is widely known and thus a detailed explanation thereof will be omitted.

Two reservoir connection ports 5 are formed at an upper surface of the cylinder body 1 (only one port 5 is illustrated in FIG. 1). In addition, a supply port 6a is formed at the cylinder body 1 so as to connect one of the pressure chambers (i.e., first pressure chamber 4) to one of the reservoir connection ports 5 while the primary piston 3 is in a return (or original) position. Another supply port (not shown) is also formed at the cylinder body 1 so as to connect the other one of the pressure chambers 4 to the other one of the reservoir connection ports 5 while the secondary piston is in a return (or original) position. The supply port 6a together with an internal passage of a valve body 7 (to be mentioned later) constitutes a reservoir fluid passage 6.

Figure 2:
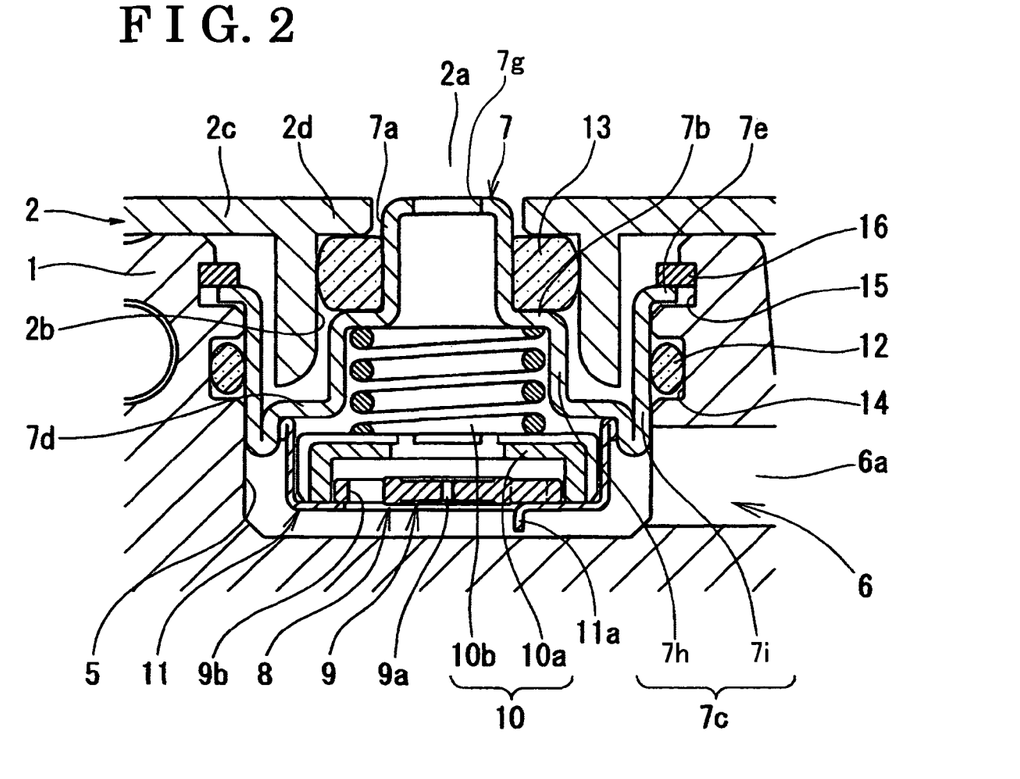
FIG. 2 is an enlarged cross sectional view illustrating a portion where a valve body of the master cylinder illustrated in FIG. 1 is assembled onto a reservoir and a cylinder body.

As illustrated in FIG. 2, a valve mechanism 8 accommodated within the valve body 7 is disposed inside of each of the reservoir connection ports 5. Since both the reservoir connection ports 5 have the same structure, only one of the reservoir connection ports 5 will be explained below.

As illustrated in FIG. 2, the valve body 7 made by a press molding of a metal plate includes a small diameter cylindrical portion 7a, a stepped portion 7b, and a large diameter cylindrical portion 7c. The small diameter cylindrical portion 7a and the large diameter cylindrical portion 7c are connected to each other via the stepped portion 7b formed at one end of the small diameter cylindrical portion 7a. The large diameter cylindrical portion 7c includes a first large diameter cylindrical portion 7h and a second large diameter cylindrical portion 7i connected to the first large diameter cylindrical portion 7h via a stepped portion 7d formed at one end of the first large diameter cylindrical portion 7h. The second large diameter cylindrical portion 7i is upwardly bent in the middle to extend up to the vicinity of the small diameter cylindrical portion 7a and to form a flange 7e at an end. The second large diameter cylindrical portion 7i faces a radially outer side of the first large diameter cylindrical portion 7h as illustrated in FIG. 2. A communication bore 7g is formed at the other end (i.e., upper end side in FIG. 2) of the small diameter cylindrical portion 7a so as to open towards the reservoir 2. The communication bore 7g is arranged on the identical horizontal plane where a bottom wall 2c, which constituting a part of a housing of the reservoir 2, is arranged.

An inner side portion of the valve body 7 is used as a part of the reservoir fluid passage 6 through which the brake fluid flows from the reservoir 2 to the hydraulic control portion such as a disc brake that brakes the wheels (not shown) via the pressure chamber 4 and through which the brake fluid returns from the hydraulic control portion to the reservoir 2 via the pressure chamber 4.

A cover 11 having a hole at a center through which the brake fluid flows is press fitted to a portion of the second large diameter cylindrical portion 7i that is not upwardly bent. Then, the valve mechanism 8 is provided inside of the second large diameter cylindrical portion 7i surrounded by the cover 11.

The valve mechanism 8 illustrated in FIG. 2 includes a relief valve 10 and a valve element 9 for reducing an area of the reservoir fluid passage 6 so that the brake fluid flows in a restricted amount in cases where a hydraulic pressure within the reservoir fluid passage 6 exceeds a predetermined value while the pressure chamber 4 and the reservoir 2 at an atmospheric pressure are connected to each other.

Figure 3:
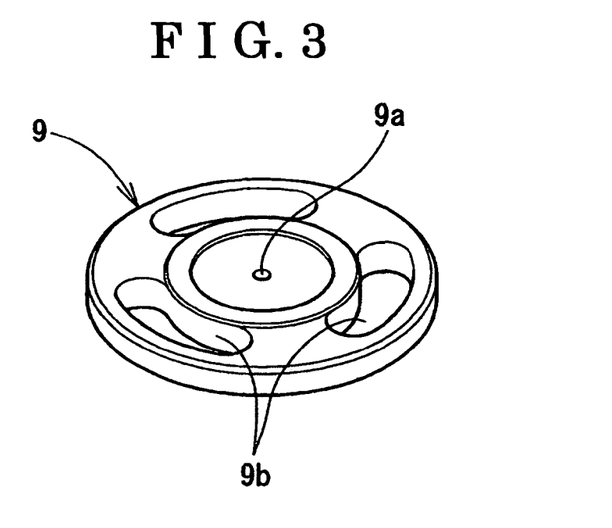
FIG. 3 is a perspective view illustrating a valve element of a valve mechanism provided at the master cylinder illustrated in FIG. 2.

An external view of the valve element 9 is illustrated in FIG. 3. The valve element 9 having a substantially disc shape includes an orifice 9a at the center and three elongated bores 9b at the outer peripheral portion. The orifice 9a and the elongated bores 9b axially penetrate through the valve element 9. The valve element 9 is made by a material having a higher density than the brake fluid, such as polypropylene (PP) and polyamide series resin (named: nylon). Thus, the valve element 9 is placed upon the cover 11 due to its own weight in a normal operating condition. At that time, each of the elongated bores 9b is in an open state so that the brake fluid flows and passes without limitation through the elongated bores 9b from the reservoir 2 to the pressure chamber 4. On the other hand, in cases where a hydraulic pressure exceeding the predetermined value is generated at the reservoir fluid passage 6, the valve element 9 receives that hydraulic pressure at a lower surface, which leads to a lifting of the valve element 9. Then, the valve element 9 is raised to a position where the valve element 9 makes contact with a valve disc 10a of the relief valve 10 (i.e., valve closed position). At this time, the elongated bores 9b are all closed. That is, the brake fluid only flows through the orifice 9a to thereby prevent the brake fluid from suddenly counterflowing to the reservoir 2 by virtue of a throttle effect.

Figure 4:
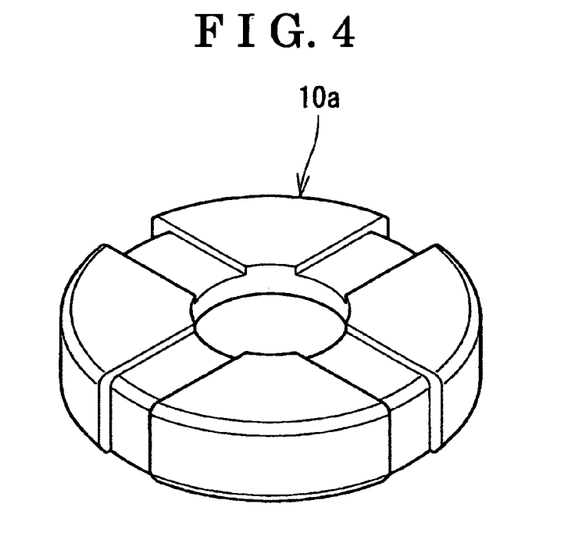
FIG. 4 is a perspective view illustrating a valve disc of a relief valve of the valve mechanism provided at the master cylinder illustrated in FIG. 2.

The relief valve 10 includes the valve disc 10a and a spring 10b for specifying a release pressure. The spring 10b biases the valve disc 10a in a closed direction (i.e., closed position) so that the valve disc 10a is pressed against a valve seat of the cover 11. In cases where a differential pressure that exceeds a specified value is applied to the valve disc 10a in the closed position, the valve disc 10a compresses the spring 10b to thereby cause the valve disc 10a to separate from the cover 11. Then, a valve portion formed at the valve disc 10a facing the cover 11 is opened so that the brake fluid in the pressure chamber 4 flows into the reservoir 2. FIG. 4 illustrates the valve disc 10a of the relief valve 10. The valve disc 10a also serves as a valve seat. That is, the reduction of the area of the reservoir fluid passage 6 is enabled or disenabled by the valve element 9 to make contact with or separate from the valve disc 10a functioning as the valve seat. One end of the spring 10b is supported by an inner surface of the stepped portion 7b as illustrated in FIG. 2.

As illustrated in FIG. 2, an inner peripheral surface of the reservoir connection port 5 and an outer peripheral surface of the second large diameter cylindrical portion 7i provided at the valve body 7 are sealed by a seal member 12 serving as a second seal member. In addition, a brake fluid entrance 2b having a circular shape in a cross section is formed at the reservoir 2 so as to downwardly extend from the bottom wall 2c of the reservoir 2. An inner peripheral surface of the brake fluid entrance 2b and the small diameter cylindrical portion 7a formed at the valve body 7 are sealed by a seal member 13 serving as a first seal member such as a grommet as illustrated in FIG. 2. The seal member 12 is accommodated in a seal groove 14 formed at the inner peripheral surface of the reservoir connection port 5. The seal member 13 is arranged between the stepped portion 7b of the valve body 7 and a seal receiving portion 2d that is formed at the reservoir 2 and that faces the stepped portion 7b so that an axial movement of the seal member 13 is restricted. In this case, alternatively, each of the seal members 12 and 13 may be held by a different structure.

The valve body 7 is fixed to the cylinder body 1 in a state where the flange 7e is sandwiched between an end surface of a recess 15 that is formed at the inner peripheral surface of the reservoir connection port 5 and a stopper 16 such as a snap ring as illustrated in FIG. 2 provided at the recess 15. As a result, the relief pressure acting on the valve mechanism 8 is not applied to the reservoir 2. In addition, the valve body 7 and the cylinder body 1 are sealed by the seal member 12 at a portion where the second large diameter cylindrical portion 7i is provided while the valve body 7 and the reservoir 2 are sealed by the seal member 13 at a portion. In the same way, the small diameter cylindrical portion 7a is provided. Thus, an axial distance between the seal members 12 and 13 can be reduced to thereby decrease a height of the master cylinder.

As illustrated in FIG. 2, a projection 11a may be formed at the cover 11 so as to extend downwardly so that a gap is ensured between a bottom surface of the reservoir connection port 5 and the cover 11 through which the brake fluid can flow, even in case the cover 11 falls from the valve body 7.

Figure 5:
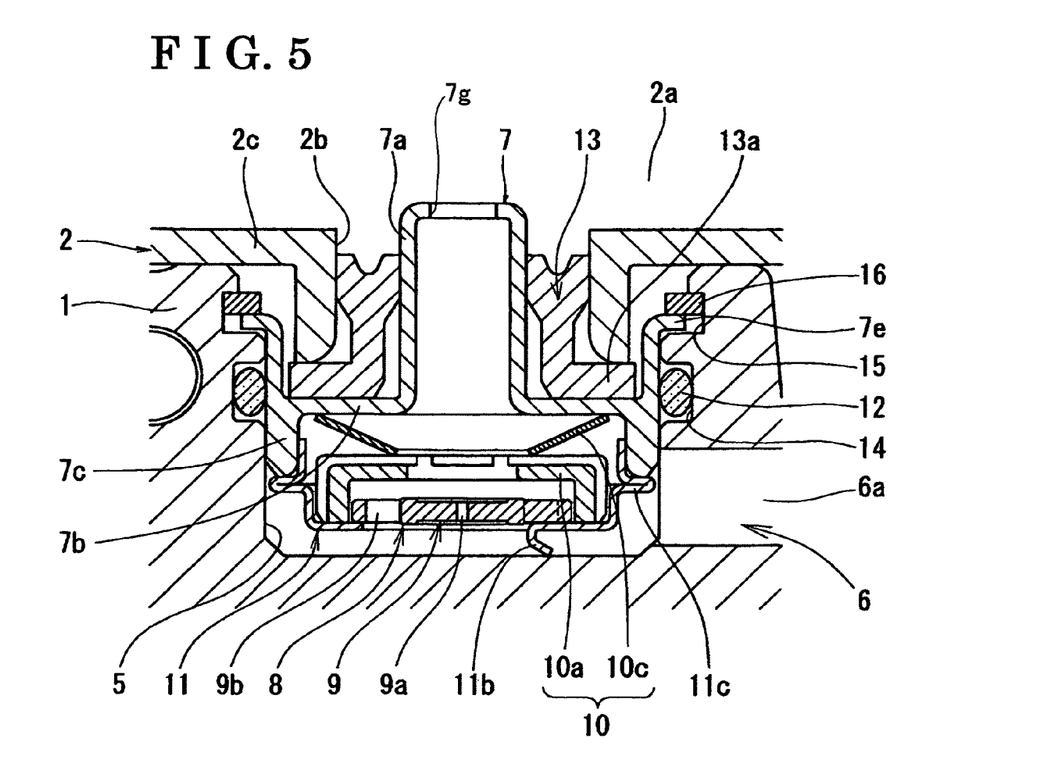
FIG. 5 is an enlarged cross sectional view illustrating a portion where a valve body of a master cylinder is assembled onto a reservoir and a cylinder body according to another embodiment of the present invention.
Figure 6:
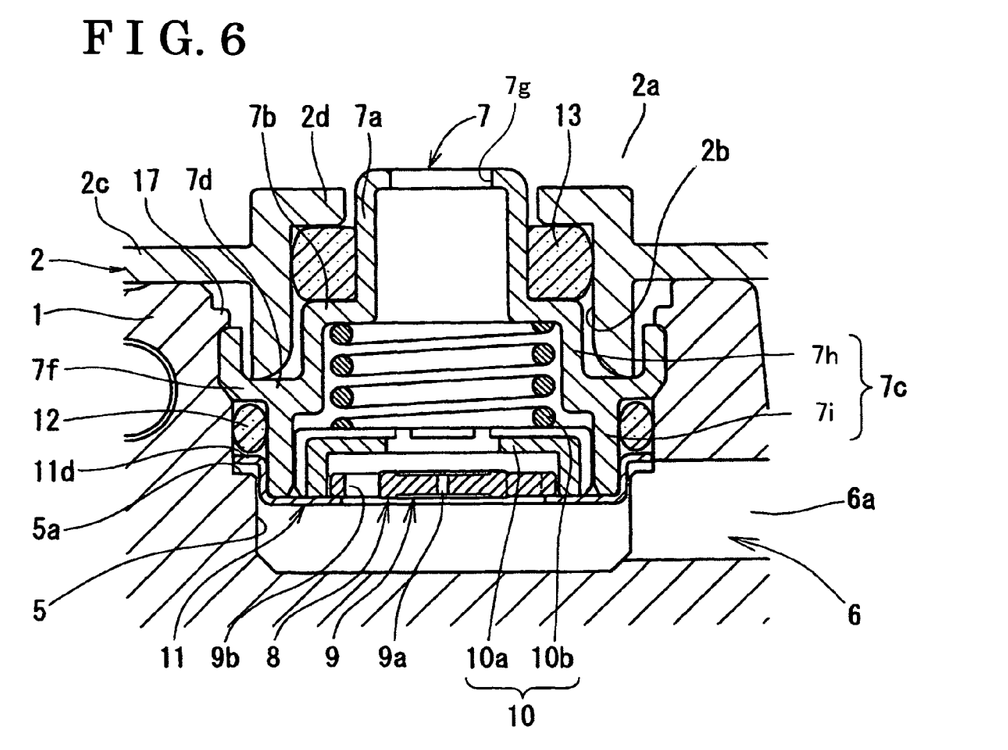
FIG. 6 is an enlarged cross sectional view illustrating a portion where a valve body of a master cylinder is assembled onto a reservoir and a cylinder body according to still another embodiment of the present invention.
Figure 7:
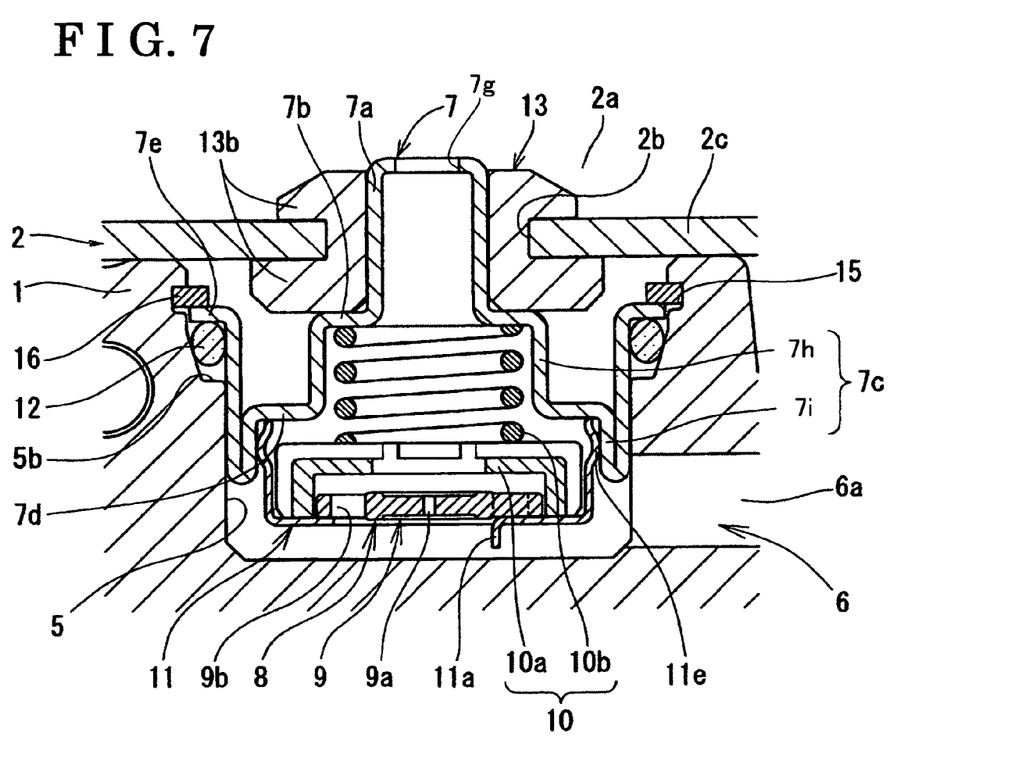
FIG. 7 is an enlarged cross sectional view illustrating a portion where a valve body of a master cylinder is assembled onto a reservoir and a cylinder body according to still another embodiment of the present invention.

FIGS. 5 to 7 illustrate the other embodiments of the valve body 7 assembled onto the cylinder body 1 and the reservoir 2. According to an embodiment illustrated in FIG. 5, the valve body 7 includes a spring plate 10c that is provided for specifying the relief pressure of the relief valve 10 and that has a short length in an axial direction to thereby reduce a height of the valve mechanism 8. In addition, a spring piece end 11b is formed at the cover 11 so as to receive a reaction force at a bottom of the reservoir connection port 5. Because of the reaction force of the spring piece end 11b, the valve body 7 (which is a rigid resin molded product, for example, as illustrated in FIG. 5) is raised to a position where the flange 7e is received by the stopper 16, so that a looseness of the valve body 7 is avoided. Further, a load receiving surface 11c is formed at the cover 11 so as to receive a press fitting load generated upon a press fitting of the cover 11 to the valve body 7. As a result, the press fitting performance of the cover 11 is enhanced.

A flange 13a is formed at a lower outer peripheral portion of the seal member 13 such as a grommet. The flange 13a is restrained between the stepped portion 7b of the valve body 7 and a projection end portion of the brake fluid entrance 2b formed by extending from the bottom wall 2c of the reservoir 2. Thus, the seal receiving portion 2d provided in the structure illustrated in FIG. 2 can be omitted. The molding performance of the reservoir 2 even equipped with the seal receiving portion 2d is still excellent, because of no slits or lateral bores serving as passages for the brake fluid, as compared to a reservoir according to the conventional art disclosed in JP2693154B. However, the structure illustrated in FIG. 5 provides further excellent molding performance of the reservoir 2.

Further, according to another embodiment illustrated in FIG. 6, a rivet portion 17 is formed at the cylinder body 1 for bringing the valve body 7 (which is a rigid resin molded product, for example, as illustrated in FIG. 6) to be fixed to the cylinder body 1. The recess 15 and the stopper 16 are not required accordingly.

A stepped surface 5a is formed in the longitudinally middle portion of the reservoir connection port 5. In addition, a flange portion 7f facing the stepped surface 5a is formed at the valve body 7. Then, the seal member 12 provided on the outer periphery of the second large diameter cylindrical portion 7i is arranged between the stepped surface 5a and the flange portion 7f. As a result, a groove for receiving the seal member 12 can be eliminated and processability of the cylinder body 1 may be enhanced. Further, a flange 11d is formed at an outer peripheral end of the cover 11 so as to engage with the stepped surface 5a. Thus, the disengagement or falling of the cover 11 may be prevented without forming an additional portion at the valve body 7.

According to still another embodiment illustrated in FIG. 7, a grommet including flanges 13b at axially both outer peripheral sides is employed as the seal member 13. The both flanges 13b engage with an inner surface and an outer surface of the bottom wall 2c of the reservoir 2, respectively, so that the brake fluid entrance 2b of the reservoir 2 is prevented from being elongated in the axial direction and thus the molding performance of the reservoir 2 is improved. In addition, the seal member 12 is assembled between a stepped surface 5b formed by a wall surface of the reservoir connection port 5 that inclines so as to be upwardly widened, and the flange 7e facing the stepped surface 5b in a compressed manner. Thus, the flange 7e is pressed against the stopper 16 by means of an elastic restoring force of the seal member 12 that results in an upward force applied to the valve body 7. In the same manner as illustrated in FIG. 5, the looseness of the valve body 7 is prevented. Further, a corner portion 11e is formed at a press-fit portion of the cover 11 relative to the valve body 7, specifically, the second large diameter cylindrical portion 7i to thereby reduce a contact area of the cover 11 with the valve body 7. Consequently, a press-fit load upon assembly of the cover 11 onto the valve body 7 is reduced.

According to the aforementioned embodiments, the seal member 13 seals between the outer periphery of the small diameter cylindrical portion 7a and the reservoir 2, and the seal member 12 seals between the outer periphery of the large diameter cylindrical portion 7c and the reservoir connection port 5.

Then, the valve body 7 including the small diameter cylindrical portion 7a and the large diameter cylindrical portion 7c is arranged inside of the reservoir connection port 5 formed at the cylinder body 1. The valve body 7 and the inner peripheral surface of the reservoir connection port 5 are sealed by the seal member 12 at a portion where the large diameter cylindrical portion 7c is provided while the valve body 7 and the inner peripheral surface of the brake fluid entrance 2b are sealed by the seal member 13 at a portion where the small diameter cylindrical portion 7a is provided. Thus, the seal members 12 and 13 are arranged axially in parallel with each other so that an axial distance therebetween is reduced. As a result, a height of the master cylinder can be shortened.

Further, the valve body 7 includes the first large diameter cylindrical portion 7h connected to the small diameter cylindrical portion 7a via the stepped portion 7b and the second large diameter cylindrical portion 7i connected to the first large diameter cylindrical portion 7h, the second large diameter cylindrical portion 7i being arranged at an axially outer peripheral side of the first large diameter cylindrical portion 7h, and the seal member 12 seals between the outer periphery of the second large diameter cylindrical portion 7i and the inner periphery of the reservoir connection port 5 while the second large diameter cylindrical portion 7i is fixed to the cylinder body 1.

The valve mechanism 8 arranged at the reservoir fluid passage 6 is accommodated inside of the valve body 7. Then, the valve body 7 is fixed to the cylinder body 1. Thus, the relief pressure generated upon the operation of the valve mechanism 8 is received by the cylinder body 1. A generation of force for lifting the reservoir 2 is prevented to thereby avoid a lifting, disengagement, breakage, and the like of the reservoir 2.

Furthermore, at least a portion of the seal member 13 sealing the outer periphery of the small diameter cylindrical portion 7a and the reservoir 2 is disposed between the stepped portion 7b formed between the small diameter cylindrical portion 7a and the large diameter cylindrical portion 7c and the seal receiving portion 2d provided at the reservoir 2 so as to face the stepped portion.

Furthermore, the seal member 13 is a grommet provided between the outer periphery of the small diameter cylindrical portion 7a and the reservoir 2, and the flanges 13b formed at both ends of the grommet engage with the inner surface and the outer surface of the bottom wall 2c of the reservoir 2, respectively.

Furthermore, the valve body 7 is fixed to the cylinder body 1 while the valve body 7 is elastically pressed against the stopper 16 mounted at the inner surface of the reservoir connection port 5.

Furthermore, the seal member 12 is arranged between the stepped surface 5a formed at a portion in a longitudinal direction of the reservoir connection port 5 and the flange portion 7f formed at the valve body 7 so as to face the stepped surface 5a.

Accordingly, a valve body receiving portion, a slit or a lateral bore serving as a passage for the brake fluid, or the like is prevented from being formed inside of the reservoir 2. As a result, the deterioration of the molding performance of the reservoir 2 may be avoided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A master cylinder comprising:
   a cylinder body arranged in communication with a reservoir;
   a reservoir connection port formed at a surface of the cylinder body and being in communication with the reservoir;
   a pressure chamber formed inside of the cylinder body;
   a reservoir fluid passage connecting the reservoir connection port and the pressure chamber to each other;
   a valve mechanism accommodated within the reservoir connection port and reducing an amount of fluid flowing in the reservoir fluid passage in a case where the reservoir fluid passage is at a high pressure;
   a valve body including a small diameter cylindrical portion and a large diameter cylindrical portion, the small diameter cylindrical portion forming a passage by means of which the reservoir and the reservoir fluid passage communicate with each other, the large diameter cylindrical portion having one end connected to an end portion of the small diameter cylindrical portion and the other end fixed to the reservoir connection port, the valve body accommodating the valve mechanism; and
   a first seal member sealing between an outer periphery of the small diameter cylindrical portion and the reservoir and a second seal member sealing between an outer periphery of the large diameter cylindrical portion and the reservoir connection port.

2. A master cylinder according to claim 1, wherein the valve body includes a first large diameter cylindrical portion connected to the small diameter cylindrical portion via a stepped portion and a second large diameter cylindrical portion connected to the first large diameter cylindrical portion, the second large diameter cylindrical portion being arranged at an axially outer peripheral side of the first large diameter cylindrical portion, and the second seal member seals between an outer periphery of the second large diameter cylindrical portion and an inner periphery of the reservoir connection port while the second large diameter cylindrical portion is fixed to the cylinder body.

3. A master cylinder according to claim 1, wherein at least a portion of the first seal member sealing the outer periphery of the small diameter cylindrical portion and the reservoir is disposed between a stepped portion formed between the small diameter cylindrical portion and the large diameter cylindrical portion and a seal receiving portion provided at the reservoir so as to face the stepped portion.

4. A master cylinder according to claim 1, wherein the first seal member is a grommet provided between the outer periphery of the small diameter cylindrical portion and the reservoir, and flanges formed at both ends of the grommet engage with an inner surface and an outer surface of a bottom wall of the reservoir respectively.

5. A master cylinder according to claim 2, wherein the valve body is fixed to the cylinder body while the valve body is elastically pressed against a stopper mounted at an inner surface of the reservoir connection port.

6. A master cylinder according to claim 1, wherein the second seal member is arranged between a stepped surface formed at a portion in a longitudinal direction of the reservoir connection port and a flange portion formed at the valve body so as to face the stepped surface.

7. A master cylinder comprising:

a cylinder body arranged in communication with a reservoir;

a reservoir connection port formed at a surface of the cylinder body and being in communication with the reservoir;

a pressure chamber formed inside of the cylinder body;

a reservoir fluid passage connecting the reservoir connection port and the pressure chamber to each other;

a valve mechanism accommodated within the reservoir connection port and reducing an amount of fluid flowing in the reservoir fluid passage in a case where the reservoir fluid passage is at a high pressure; and a valve body including a small diameter cylindrical portion forming a passage by means of which the reservoir and the reservoir fluid passage communicate with each other and a communication bore formed adjacent to the small diameter cylindrical portion and opening towards the reservoir, the communication bore being arranged on an identical horizontal plane where a bottom wall of the reservoir is arranged.

* * * * *